Figure 1:
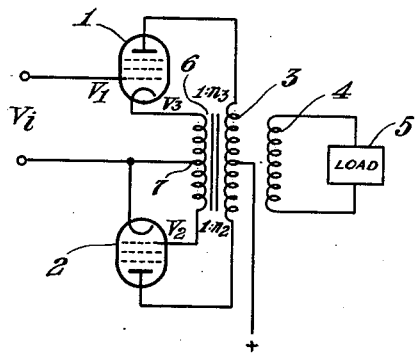

INVENTOR.
HENRICUS ADRIANUS BROOS.
BY
AGENT.

Patented July 17, 1951

2,561,047

UNITED STATES PATENT OFFICE 2,561,047

PHASE INVERTER CIRCUIT

Henricus Adrianus Broos, Eindhoven, Netherlands, assignor to Hartford National Bank and Trust Company, Hartford, Conn., as trustee Application June 10, 1947, Serial No. 753,737
In the Netherlands June 18, 1946

10 Claims. (Cl. 179—171)

This invention relates to a circuit-arrangement comprising two amplifying tubes connected in push-pull, in which the voltage to be amplified is supplied as a control voltage for the grid circuit of the first tube and the control voltage for the grid of the second tube is derived from the output voltage of the two tubes. Circuits of this kind are known as phase inverter circuits, in contradistinction to push-pull circuits in which the control voltage of the second tube is also derived from the voltage to be amplified and in which, for example by means of a push-pull transformer, it is ensured that this control voltage is in out of phase with the control-voltage of the grid of the first tube.

In a phase inverter circuit of the known type, the output circuit of the two tubes includes a potentiometer, the extremities of which are connected to the positive terminal of the anode supply.

The control-grid voltage of the first tube equals the alternating input voltage and that of the second tube is derived from a tapping on the said potentiometer. The tapping point is located at the centre, or is slightly displaced towards the anode of the first tube with respect to the centre so that the second tube conveys an alternating grid-voltage having approximately the same value as that supplied to the first tube, but of opposite phase.

This circuit exhibits the disadvantage that supply voltage variations are impressed on the grid of the second tube with the result that an amplification of supply voltage variations occurs in the output.

In a phase inverter circuit of the known type, this disadvantage is obviated by the provision of an output transformer in the output circuit of the phase inverter tubes and taking the control voltage for the second tube from a secondary winding.

However, another disadvantage now arises, viz. that in the case of exact symmetry of the two tubes the second tube is on the point of self-oscillating.

The object of the invention is to provide a simple circuit in which both disadvantages are eliminated.

According to the invention, a phase inverting circuit is used having a negative feedback from the output circuit to the grid circuit or cathode circuit of the first tube. This feedback is such that variations in the amplification factor, etc., causing the amplitude of the grid voltage of the second tube to increase result in a decrease of the first tube gain by an amount which is approximately equal or greater than the variation to be compensated.

In order that the invention may be more clearly understood and readily carried into effect, it will now be described more fully with reference to the accompanying drawing.

The circuit shown in Figure 1 comprises an output transformer having a secondary winding the ends of which are connected to the cathode of the first tube and to the grid of the second tube, while the cathode of the second tube is connected to a tapping on this winding and to one of the terminals of the input voltage supply.

Figure 2:
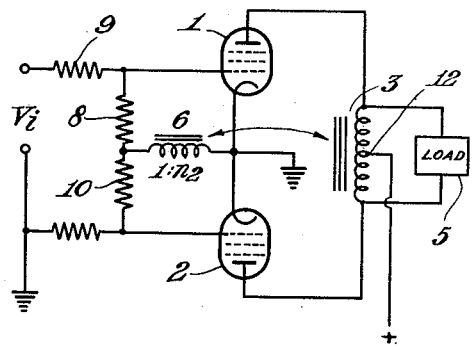
Figure 3:
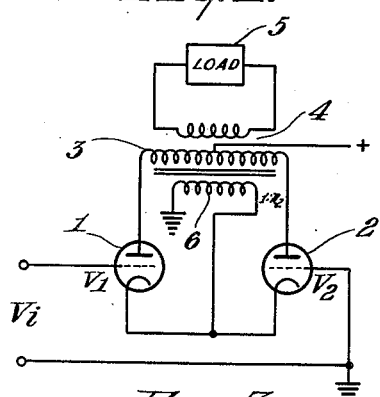
Figure 4:
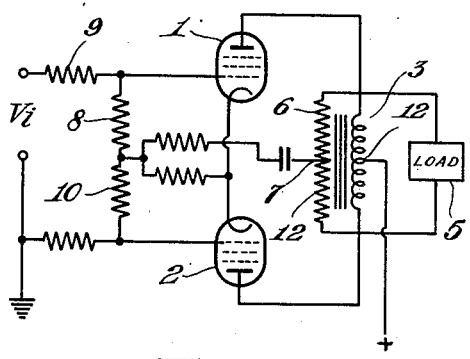
Figure 5:
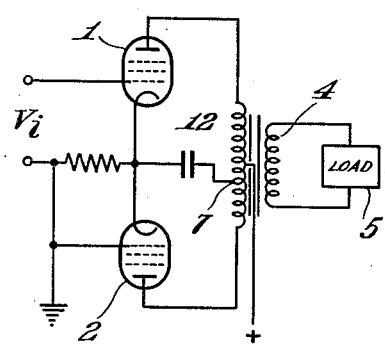

In the circuits shown in Figures 2 and 3 a voltage which is proportional to the output voltage is applied in the common cathode circuit or grid circuit of both tubes by means of an inductive coupling and, in the circuits shown in Figures 4 and 5, by means of a potentiometer or a tapping on the primary winding of the output transformer.

Figure 6:
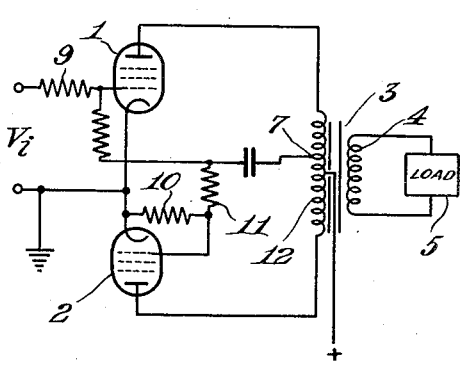

In the circuit shown in Figure 6 the cathodes of the two tubes are connected to one terminal of the input voltage supply, the grid of the second tube being connected to a tap on a potentiometer or to the primary winding of an output transformer. The grid of the first tube is connected to a tap on a potentiometer located between one terminal of the input voltage supply and the grid of the second tube.

The various circuits will now be described in greater detail hereinafter.

In Fig. 1, reference numerals 1 and 2 denote the two phase inverting tubes which are adapted to operate in class A, AB, B or C. The common anode circuit of the tubes includes an output transformer 3 of which the secondary winding 4 is connected to a load 5. A secondary winding 6 having a tapping point 7 is provided. One end of the winding 6 is connected to the cathode of tube 1, the other end being connected to the grid at which the input voltage $V_1$ is supplied to the grid of tube 2.

If the grid voltages of the tubes with respect to the cathodes are assumed as $V_1$ and $V_2$ respectively, the amplification factor of the tubes $= \mu$, and the transformation ratio as $n_2:1$ and $n_3:1$ respectively, we have for the voltage of the primary winding of transformer 3:

$$V_u = \frac{\mu}{2}(V_1 + V_2)$$

Now:

$$V_i = V_1 + V_3;\quad V_2 = \frac{V_u}{n_2} \text{ and } V_3 = \frac{V_u}{n_3}$$

so that:

$$V_1 = \frac{n_3(2n_2-\mu)}{2n_2 n_3 + n_2\mu - n_3\mu} V_i$$

$$V_2 = \frac{n_3\mu}{2n_2 n_3 + n_2\mu - n_3\mu} V_i$$

and $$\frac{V_2}{V_1} = \frac{\mu}{2n_2-\mu}$$

Consequently, as a condition for exact push-pull action, $V_2/V_1 = 1$ and hence $n_2 = \mu$. The positive feedback obtained by the provision of the transformer $1:n_2$ is counteracted by the negative feedback brought about by the transformer $1:n_3$. Consequently building-up of tube 2, that is to say an increase of the amplitude of the grid voltage of this tube by an amount $\Delta V_2$, which is due to a greater amplification factor $\mu$, immediately leads to an increase of the voltage $V_3$ and hence to a decrease of the grid voltage $V_1$ of tube 1 to an amount $-\Delta V_1$. The calculation shows that $$\frac{dV_2/d\mu}{dV_1/d\mu} = -1$$

that is to say $-\Delta V_1 = \Delta V_2$.

Variation in the amplification factor $\mu$ is usually attributable to variations in the mutual conductance of the tubes which may be the consequence of anode-voltage variations, ageing of the tubes, etc.

An advantageous value for $n_3$ is, for example, $n_3 = n_2$, placing the tap point 7 at the centre of the winding 6. In this case the backcoupling factor is 2.

In Figure 2 identical circuit-elements are indicated by the same reference numerals.

By means of the resistances 8 and 9 the grid voltage of tube 1, which is in out of phase with the voltage across the winding 6, is in phase with, but of smaller amplitude than the input voltage $V_1$. Corresponding resistances 10 and 11 restore the push-pull action.

In the circuit shown in Figure 3 it is the other end of winding 6 which is connected to earth so that the resistances 8, 9, 10 and 11 may be dispensed with. In this circuit, applying the push-pull condition $n_2 = \mu$, as before, $V_1 = V_2 = \frac{1}{2} Vi$. Thus a two-fold negative feedback is provided. The potentiometers 8, 9, 10 and 11 included in the circuit shown in Fig. 2 permit alternate values of negative feedback.

The circuit shown in Figures 4 and 5 provide solutions according to the invention which overcome the disadvantage of the known phase inverter circuits previously mentioned. Use is made of a potentiometer 6 or a tapping 7 on the primary winding of the output transformer since it appears from these circuits, which otherwise are identical with those of Figures 2 and 3, that a supply voltage at the centre 12 of the said primary winding or of the potentiometer 6, which also occurs with approximately equal amplitude at the tap point 7, is supplied in the same phase to both tubes. Consequently the anode-current variations in the tubes 1 and 2 resulting from this supply voltage neutralise one another.

The circuit shown in Figure 6 affords the advantage with respect to those of Figures 3 and 5 that no cathode current causes the winding 6 or potentiometer to be loaded, while a number of circuit elements smaller than in Figure 2 and 4 suffices. Furthermore the potentiometer 8—9, which is included between one terminal of the input voltage supply $V_1$ and the negative feedback voltage of tap point 7 permits the insertion of any arbitrary negative feedback, which is not possible in the circuits shown in Figures 3 and 4. Moreover, the potentiometer 10—11, which need not necessarily be identical with the potentiometer 8—9, allows a control with which $-\Delta V_1$ is greater than $\Delta V_2$.

What I claim is:

1. A phase inverter amplifier circuit arrangement comprising first and second thermionic discharge tubes having each a cathode, grid, anode and energizing circuits therefor, a source of desired signals having a given phase, means to couple the said source of desired signals to the grid-cathode circuit of the said first thermionic discharge tube, an output stage, multi-tapped impedance means to connect the said output stage to the anode-cathode circuits of the said first and second thermionic discharge tubes in push-pull, means to derive a signal voltage from the anode-cathode circuit of the said first thermionic discharge tube out of phase with the said source of desired signals, said latter means comprising a tapped portion of the said impedance means connected in the grid-cathode circuit of the said first and second thermionic discharge tubes whereby said first thermionic discharge tube is supplied an inverse feedback voltage.

2. In a phase inverter amplifier having first and second thermionic discharge tubes having each a cathode, grid, anode and energizing circuits therefor, a source of desired signals having a given phase, means to couple the said source of desired signals to the grid-cathode circuit of the said first thermionic discharge tube, an output stage, impedance means to connect the said output stage to the anode-cathode circuits of the said first and second thermionic discharge tubes in push-pull, the circuit comprising means to derive a signal voltage from the anode-cathode circuit of the said first thermionic discharge tube out of phase with the said source of desired signals, said latter means comprising a tapped resistive element in parallel with the said impedance means, and means to connect a portion of the tapped resistive element in the grid-cathode circuit of the said first and second thermionic discharge tubes whereby said first thermionic discharge tube is supplied an inverse feedback voltage.

3. In a phase inverter amplifier having first and second thermionic discharge tubes having each a cathode, grid, anode and energizing circuits therefor, a source of desired signals having a given phase, means to couple the said source of desired signals to the grid-cathode circuit of the said first thermionic discharge tube, an output stage and tapped transformer means to connect the said output stage to the anode-cathode circuits of the said first and second thermionic discharge tubes in push-pull, the circuit comprising means to derive a signal voltage from the anode-cathode circuit of the said first thermionic discharge tube out of phase with the said source of desired signals, said latter means comprising a tapped portion of the said transformer means connected in the grid-cathode circuit of the said first and second thermionic discharge tubes whereby said first thermionic discharge tube is supplied an inverse feedback voltage.

4. An electrical circuit arrangement for amplifying a first signal voltage, comprising first and second electron discharge tubes each having a cathode and a grid defining a grid-cathode circuit and each having an anode, a first inductive element intercoupling the anodes of said first and second discharge tubes, an output circuit coupled to said first inductive element, means to apply said first signal voltage to the grid-cathode circuit of said first discharge tube, means comprising a second inductive element inductively coupled to said first inductive element to derive from said first inductive element a second signal voltage and means to apply said second signal voltage to the grid-cathode circuit of said first discharge tube in phase opposition to said first signal voltage and at a given amplitude, and to apply said second signal voltage to the grid-cathode circuit of said second discharge tube in phase opposition to said first signal voltage and at substantially said given amplitude.

5. An electrical circuit arrangement for amplifying a first signal voltage comprising first and second electron discharge tubes each having a cathode and a grid defining a grid-cathode circuit and each having an anode, an inductive element intercoupling the anodes of said first and second discharge tubes, an output circuit coupled to said inductive element, means to apply said first signal voltage to the grid-cathode circuit of said first discharge tube, means comprising a tapped inductive element inductively coupled to said inductive element to derive from said inductive element a second signal voltage, means to couple one end of said tapped inductive element to the cathode of said first discharge tube to apply said second signal voltage to the grid-cathode circuit of said first discharge tube in phase opposition to said first signal voltage and at a given amplitude, and means to couple the tapping of said tapped inductive element to the cathode of said second discharge tube and the other end of said tapped inductive element to the grid of said second discharge tube to apply said second signal voltage to the grid-cathode circuit of said second discharge tube in phase opposition to said first signal voltage and at substantially said given amplitude.

6. An electrical circuit arrangement for amplifying a first signal voltage comprising first and second electron discharge tubes each having a cathode and a grid defining a grid-cathode circuit and each having an anode, a first inductive element intercoupling the anodes of said first and second discharge tubes, an output circuit coupled to said first inductive element, a first potentiometer element having a tapping coupled to the grid of said first discharge tube, a second potentiometer element having a tapping coupled to the grid of said second discharge tube, means to interconnect one end of each of said potentiometers to define a junction, means to connect the other end of said second potentiometer to a point of said circuit arrangement at ground potential, means to apply said first signal voltage to the other ends of said potentiometers, means to interconnect the cathodes of said discharge tubes and said point at ground potential, means comprising a second inductive element inductively coupled to said first inductive element to derive from said first inductive element a second signal voltage, means to couple one end of said second inductive element to said point at ground potential, and means to couple the other end of said second inductive element to the junction of the one end of said potentiometers thereby to apply said second signal voltage to the grid of said first discharge tube in phase opposition to said first signal voltage and at a given amplitude and to the grid of said second discharge tube in phase opposition to said first signal voltage and at substantially said given amplitude.

7. An electrical circuit arrangement for amplifying a first signal voltage comprising first and second electron discharge tubes each having a cathode and a grid defining a grid-cathode circuit and each having an anode, a first inductive element intercoupling the anodes of said first and second discharge tubes, an output circuit coupled to said first inductive element, terminal means coupled to the grid of said first discharge tube and to a point of said circuit arrangement at ground potential, means to apply said first signal voltage to said terminal means, means comprising a second inductive element inductively coupled to said first inductive element to derive from said first inductive element a second signal voltage, means to couple one end of said second inductive element to said point at ground potential, and means to couple the other end of said second inductive element to the cathodes of said first and second discharge tubes thereby to apply said second signal voltage to the grid-cathode circuit of said first discharge tube in phase opposition to said first signal voltage and at a given amplitude and to apply said second signal voltage to the grid-cathode circuit of said second discharge tube in phase opposition to said first signal voltage and at substantially said given amplitude.

8. An electrical circuit arrangement for converting a first signal voltage into a push-pull voltage, comprising first and second electron discharge tubes each having an input circuit and having a common push-pull output circuit, means to apply operating potentials having a hum component to said discharge tubes, means to apply said first signal voltage to the input circuit of said first discharge tube, first circuit means intercoupling said common output circuit and the input circuit of said second discharge tube to derive from said output circuit a second signal voltage and to apply said second signal voltage to the input circuit of said second discharge tube in phase opposition to said first signal voltage, second circuit means intercoupling said common output circuit and the input circuit of said first discharge tube in negative feedback relationship, and means comprising said first and second circuit means to suppress said hum component.

9. An electrical circuit arrangement for converting a first signal voltage into a push-pull voltage, comprising first and second electron discharge tubes each having an input circuit and having a common push-pull output circuit, means to apply operating potentials having a hum component to said discharge tubes, means to apply said first signal voltage to the input circuit of said first discharge tube, first inductive circuit means intercoupling said common output circuit and the input circuit of said second discharge tube to derive from said output circuit a second signal voltage and to apply said second signal voltage to the input circuit of said second discharge tube in phase opposition to said first signal voltage, second inductive circuit means intercoupling said common output circuit and the input circuit of said first discharge tube in negative feedback relationship, and means comprising said first and second circuit means to prevent application of said hum component to the input circuits of said discharge tubes.

10. An electrical circuit arrangement for converting a first signal voltage into a push-pull voltage, comprising first and second electron discharge tubes each having an input circuit and having a common push-pull output circuit, means to apply operating potentials having a hum component to said discharge tubes, means to apply said first signal voltage to the input circuit of said first discharge tube, first circuit means intercoupling said common output circuit and the input circuit of said second discharge tube to derive from said output circuit a second signal voltage and to apply said second signal voltage to the input circuit of said second discharge tube in phase opposition to said first signal voltage, second circuit means intercoupling said common output circuit and the input circuit of said first discharge tube in negative feedback relationship, said second circuit means providing a negative feedback factor of 2, and means comprising said first and second circuit means to apply said hum component to the input circuits of said first and second discharge tubes with substantially equal magnitudes and in substantially the same phase.

HENRICUS ADRIANUS BROOS.

REFERENCES CITED

The following references are of record in the file of this patent:

UNITED STATES PATENTS

| Number | Name | Date |
|---|---|---|
| 2,322,528 | Lewis | June 22, 1943 |
| 2,338,342 | Lissmann | Jan. 4, 1944 |
| 2,383,846 | Crawley | Aug. 28, 1945 |

FOREIGN PATENTS

| Number | Country | Date |
|---|---|---|
| 114,744 | Australia | Mar. 5, 1942 |
| 504,960 | Great Britain | May 3, 1939 |